US012724736B2

(12) United States Patent
Wang

(10) Patent No.: US 12,724,736 B2
(45) Date of Patent: Sep. 1, 2026

(54) DAISY-CHAINED SERIAL PERIPHERAL INTERFACE

(71) Applicant: Qorvo US, Inc., Greensboro, NC (US)

(72) Inventor: Shaoyun Wang, San Jose, CA (US)

(73) Assignee: Qorvo US, Inc., Greensboro, NC (US)

( * ) Notice: Subject to any disclaimer, the term of this patent is extended or adjusted under 35 U.S.C. 154(b) by 84 days.

(21) Appl. No.: 18/384,962

(22) Filed: Oct. 30, 2023

(65) Prior Publication Data

US 2024/0152480 A1 May 9, 2024

Related U.S. Application Data

(60) Provisional application No. 63/423,623, filed on Nov. 8, 2022.

(51) Int. Cl.
*G06F 13/42* (2006.01)

(52) U.S. Cl.
CPC ................................ *G06F 13/4282* (2013.01)

(58) Field of Classification Search
None
See application file for complete search history.

(56) References Cited

U.S. PATENT DOCUMENTS 8,458,371 B2 * 6/2013 Scorsi ................. G06F 13/4022 710/8
8,832,475 B1 * 9/2014 Sheets ................... G06F 1/3287 712/228
8,892,767 B1 * 11/2014 Yi ......................... G06F 13/102 709/237
9,152,598 B2 * 10/2015 Fosse .................. G06F 13/4291
9,274,997 B2 * 3/2016 Berenbaum ......... G06F 13/4256
10,289,596 B2 * 5/2019 Chen ................... G06F 13/1673
10,635,827 B2 * 4/2020 Pearson .............. G06F 13/4282
2012/0166582 A1 * 6/2012 Binder ...................... G06F 7/58 709/217
2013/0073810 A1 * 3/2013 Alon .................. G06F 13/1663 711/147

(Continued)

OTHER PUBLICATIONS

Maxim Integrated, "Application Note 3947: Daisy-Chaining SPI Devices," Dec. 15, 2006, available from the Internet: [URL: https://www.maximintegrated.com/en/app-notes/index.mvp/id/3947], 8 pages.

(Continued)

*Primary Examiner* — Steven G Snyder
*Assistant Examiner* — Christopher A Bartels
(74) *Attorney, Agent, or Firm* — Withrow & Terranova, P.L.L.C.

(57) ABSTRACT

Embodiments described herein provide SPI systems that can accommodate more peripheral devices on a serial data signal line. The present disclosure relates to various configurations of SPI communication interfaces that operably connect one or more peripheral devices serially to a controller device. The configurations of serially-connected peripheral devices can enable more peripheral devices to be supported on a serial data signal line in each SPI system. The present disclosure reduces or eliminates the limitation regarding the driving capability of the controller device or the peripheral devices. The present disclosure further reduces the restriction regarding the pin count requirement for the select signals.

13 Claims, 9 Drawing Sheets

(56) References Cited

U.S. PATENT DOCUMENTS

| | | | | |
|---|---|---|---|---|
| 2016/0371203 | A1* | 12/2016 | Riess | G06F 13/4282 |
| 2018/0089120 | A1* | 3/2018 | Riekstins | G06F 13/364 |
| 2018/0102779 | A1* | 4/2018 | Behel | H04L 7/02 |
| 2019/0278736 | A1* | 9/2019 | Aherne | G06F 13/16 |
| 2020/0026673 | A1* | 1/2020 | Riekstins | G06F 13/364 |
| 2022/0004518 | A1* | 1/2022 | Lin | G06F 11/1004 |
| 2022/0188262 | A1* | 6/2022 | Heckroth | G06F 13/4282 |
| 2022/0253398 | A1* | 8/2022 | Hyakudai | G06F 13/4282 |
| 2023/0004516 | A1* | 1/2023 | Hegde | G06F 13/4282 |
| 2023/0350837 | A1* | 11/2023 | Xu | G06F 13/102 |
| 2025/0030530 | A1* | 1/2025 | Wang | G06F 13/426 |
| 2025/0103517 | A1* | 3/2025 | Zhao | G06F 13/36 |

OTHER PUBLICATIONS

Wikipedia, "Serial Peripheral Interface," Nov. 2022, available from the Internet: [URL: https://en.wikipedia.org/w/index.php?title=Serial_Peripheral_Interface&oldid=1120362916], 20 pages.

* cited by examiner

FIG. 1 – Related Art

DAISY-CHAINED SERIAL PERIPHERAL INTERFACE

RELATED APPLICATIONS

This application claims the benefit of provisional patent application Ser. No. 63/423,623, filed Nov. 8, 2022, the disclosure of which is hereby incorporated herein by reference in its entirety.

FIELD OF THE DISCLOSURE

The present disclosure relates generally to communication interfaces, and more particularly to serial peripheral interfaces. Still more particularly, the present disclosure relates to daisy-chained serial peripheral interfaces.

BACKGROUND

In telecommunications and data transmission, serial communication is a process of sending data one bit at a time, sequentially, over a data signal line, data bus, or a data cable (hereinafter "signal line"). The Serial Peripheral Interface (SPI) is a synchronous serial data communication interface that defines a data transfer protocol between a controller device and peripheral devices connected to a serial data signal line. However, the SPI communication interface has limitations on the total number of peripheral devices that can be connected to the serial data signal line. One limitation is an electrical restriction. The controller device has limited driving ability on both the clock signal and the data signal. The peripheral device has limited driving ability on the data signal. The integrity of the clock signal may be compromised when the total number of peripheral devices connected to the serial clock signal line exceeds the driving ability of the controller device. The timing relationship between the clock signal and the data signal may be corrupted when the total number of peripheral devices connected to the serial data signal line exceeds the driving ability of the controller device or the peripheral devices, whichever is lower. Another limitation on the SPI communication interface relates to the configuration of the controller device itself. The total number of select signal pins provided by the controller device limits the total number of peripheral devices that can be connected to the serial data signal line.

SUMMARY

Embodiments described herein provide SPI systems that can accommodate more peripheral devices on a serial data signal line. The present disclosure relates to various configurations of SPI communication interfaces that operably connect one or more peripheral devices serially to a controller device. The configurations of serially-connected peripheral devices can enable more peripheral devices to be supported on a serial data signal line in each SPI system. The present disclosure reduces or eliminates the limitation regarding the driving capability of the controller device or the peripheral devices. The present disclosure further reduces the restriction regarding the pin count requirement for the select signals.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
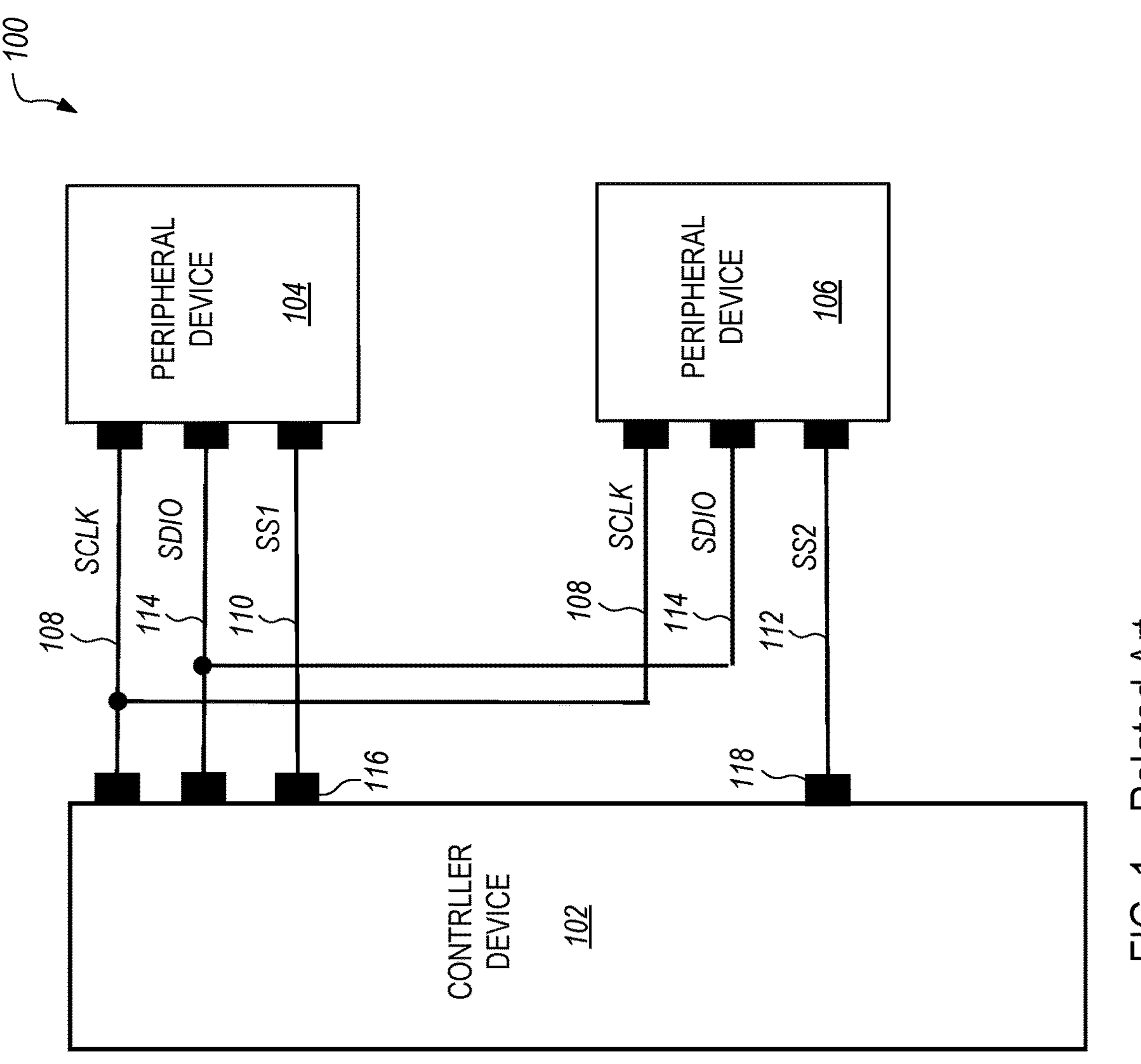
FIG. 1 illustrates a block diagram of a first serial peripheral interface (SPI) system that includes two peripheral devices according to related art.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

Disclosed herein are embodiments of a daisy-chained Serial Peripheral Interface (SPI) system that includes a controller device and one or more peripheral devices arranged in at least one daisy chain. The SPI system daisy chains a data signal, a serial clock (SCLK) signal, and a peripheral select (SS) signal. In some instances, serial data are transferred to and from the peripheral devices on two or more different lines. The controller device transmits data to a targeted peripheral device on a controller-output-peripheral-input (MOSI) signal line and receives data from the target peripheral device on a controller-input-peripheral-output (MISO) signal line. In other instances, the SPI system merges the daisy chain of a controller-out-peripheral-in (MOSI) signal and a controller-input-peripheral-output (MISO) signal in a chain. Both the MOSI signal line and the MISO signal line are combined to reduce a four-wire SPI system into a three-wire SPI system that includes a bidirectional serial data input-output (SDIO) signal to carry the data to and from the peripheral devices. Thus, a data signal can include both the MOSI signal and the MISO signal, or the data signal may include the bidirectional SDIO signal.

In some embodiments, the peripheral devices are identical in construction and operation. Each peripheral device passes the SCLK signal from an input of the peripheral device to an output of the peripheral device. In certain embodiments, one or more of the peripheral devices are operable to delay the peripheral SS signal for a total number SCLK clock pulses in one transaction (e.g., a read transaction or a write transaction). The SS signal in the daisy-chained SPI system retains the function of selecting a respective peripheral device targeted for a transaction. In some instances, the SS signal output from one peripheral device selects the next peripheral device in the daisy chain, or selects the immediately next peripheral device in the daisy chain. In certain embodiments, one or more peripheral devices in the daisy chain are operable to pass the SDIO signal or the MOSI signal through the peripheral device when the peripheral device is not the target peripheral device (e.g., not the peripheral device to execute a transaction). When a transaction is a write transaction, a targeted peripheral device is operable to process and pass the SDIO signal or the MOSI signal through the peripheral device. For a read transaction, a targeted peripheral device is operable to output data from the peripheral device (e.g., the targeted peripheral device replaces the data field in the SDIO signal or the MOSI signal with the read out data and passes the SDIO signal or the MOSI signal to the next peripheral device (if there is a next peripheral device).

In certain embodiments, a controller device is operably connected to multiple chains of peripheral devices in one daisy-chained SPI system. Each chain must have identical peripheral devices. For example, all the peripheral devices on a first chain may have ten (10) address bits, two (2) command bits, and eight (8) data bits while all the peripheral devices on a second chain can have eight (8) address bits, one (1) command bit, and four (4) data bits.

The controller device is operable to choose either the SCLK signal at the end of the daisy chain or an SPI SCLK signal driven out by the controller device. An input/output (IO) buffer in each peripheral device adds a combinatorial delay to the SCLK signal line. The more peripheral devices on the daisy chain, the greater the delay. The delay accumulates to a point where the controller device uses the SCLK signal output from the peripheral device at the end of the daisy chain to clock in the SDIO signal or the MISO signal.

FIG. 1 illustrates a block diagram of a first SPI system 100 according to related art. The first SPI system 100 includes a controller device 102, first peripheral device 104, and second peripheral device 106. The first peripheral device 104 and the second peripheral device 106 are operably connected in parallel to the controller device 102. The controller device 102 provides the SCLK signal on a SCLK signal line 108 to the first peripheral device 104 and to the second peripheral device 106. All signal transitions in the first SPI system 100 are synchronized to the SCLK signal.

To select a targeted peripheral device among the peripheral devices, the controller device is operable to provide SS signals to the peripheral devices on different signal lines. For example, in FIG. 1, the controller device 102 is operable to provide an SS1 signal to the first peripheral device 104 on SS1 signal line 110, and an SS2 signal to the second peripheral device 106 on signal line 112. Serial data are transferred to and/or from the first peripheral device 104 and the second peripheral device 106 on the bidirectional SDIO signal line 114.

A total number of the first peripheral devices 104 and the second peripheral devices 106 that can be operably connected to the SCLK signal line 108 is limited in the first SPI system 100. This is due in part to the limited driving capability of the controller device 102 on the SCLK signal. The integrity of the SCLK signal may be compromised if the total number of the first peripheral devices 104 and the second peripheral devices 106 operably connected to the bidirectional SDIO signal line 114 exceeds the driving capability of the controller device 102 or the driving capability of the first peripheral device 104 or the second peripheral device 106. Additionally or alternatively, the total number of the first peripheral devices 104 and the second peripheral devices 106 that can be operably connected to the bidirectional SDIO signal line 114 is limited by the total number of select signal pins provided by the controller device 102. Since the first peripheral device 104 and the second peripheral device 106 are operably connected to respective select signal pins at the controller device 102, the number of select signal pins define the number of peripheral devices that can be operably connected to the controller device. For example, in FIG. 1, the first peripheral device 104 is operably connected to a select signal pin 116 and the second peripheral device 106 is operably connected to a select signal pin 118. Additional peripheral devices may be operably connected to the controller device 102 only if the controller device 102 has additional unused select signal pins.

Figure 2:
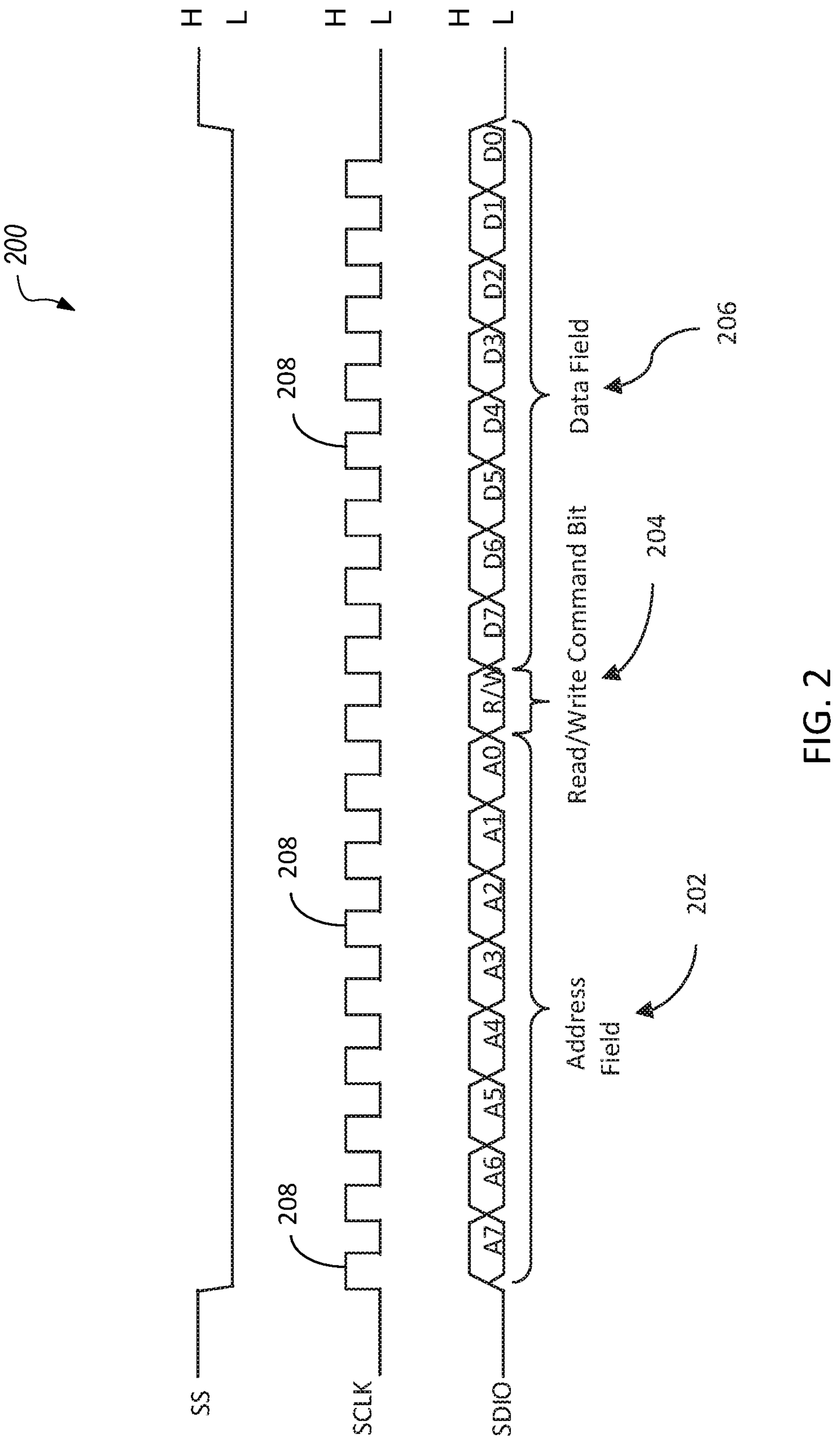
FIG. 2 illustrates an example timing diagram for a single transaction in the SPI system shown in FIG. 1.

FIG. 2 illustrates an example timing diagram 201 for a single transaction 200 in the SPI system shown in FIG. 1. The data on the SDIO signal line for the transaction 200 comprises an address field 202, a command field 204, and a data field 206. In this example timing diagram 201, the address field 202 is eight (8) bits, the command field 204 is one (1) bit, and data field 206 is eight (8) bits. The SS signal (the SS1 signal or the SS2 signal in FIG. 1) is output from a respective SS signal pin on the controller device to select a targeted peripheral device. The SS signal transitions to a low signal level at the start of the transaction 200 and remains at the low signal level for the entire transaction 200. For each SCLK signal pulse 208, a bit is output on the SDIO signal line. The targeted peripheral device receives the bits via the SDIO signal line and assembles the command by obtaining information from the address field 202 (to identify the register of the targeted peripheral device), the command field 204 (to identity the action to be taken by the target peripheral device), and the data field 206 (to provide the data associated with the command). At the end of the transaction 200, the SS signal transitions back to a high signal level.

Figure 3:
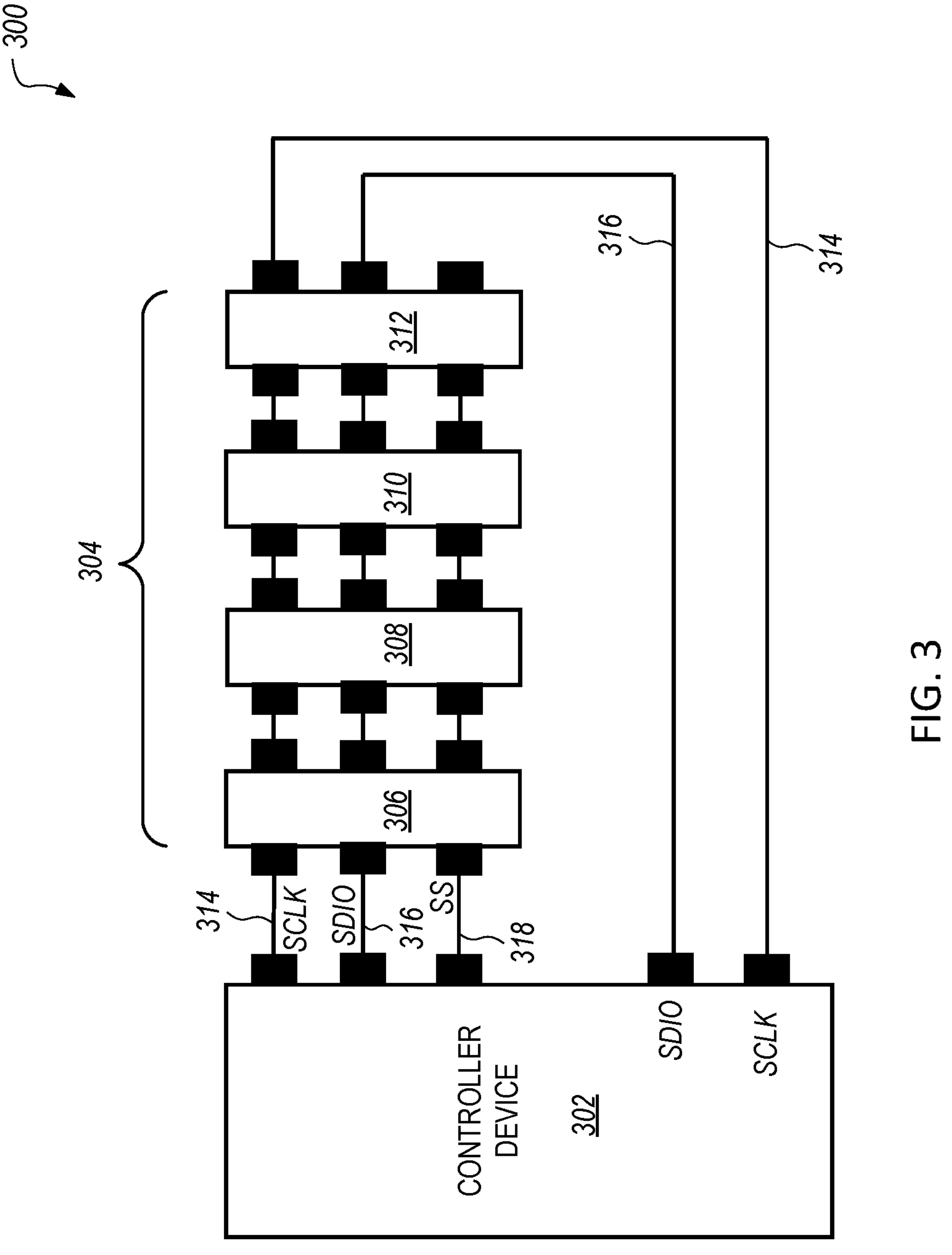
FIG. 3 illustrates a block diagram of an example second SPI system that includes one chain of peripheral devices according to embodiments of the disclosure.

FIG. 3 illustrates a block diagram of an example second SPI system 300 that includes one chain of peripheral devices 304 according to embodiments of the disclosure. The example second SPI system 300 includes a controller device 302 operably connected to the chain of peripheral devices 304, where the chain of peripheral devices 304 includes a first peripheral device 306, a second peripheral device 308, a third peripheral device 310, and a fourth peripheral device 312 operably connected in series. Other embodiments can include any number of peripheral devices in the chain of peripheral devices 304 (e.g., two or more peripheral devices).

An SCLK signal is transmitted to the first peripheral device 306, the second peripheral device 308, the third peripheral device 310, and the fourth peripheral device 312 on an SCLK signal line 314. Each of the first peripheral device 306, the second peripheral device 308, and the third peripheral device 310 is operable to pass the SCLK signal to the next peripheral device in the chain of peripheral devices 304. The fourth peripheral device 312 passes the SCLK signal to the controller device 302 on the SCLK signal line 314.

An SDIO signal is transmitted to the first peripheral device 306, the second peripheral device 308, the third peripheral device 310, and the fourth peripheral device 312 on an SDIO signal line 316. Each of the first peripheral device 306, the second peripheral device 308, and the third peripheral device 310 is operable to pass the SDIO signal to the next peripheral device in the chain of peripheral devices 304. The fourth peripheral device 312 passes the SDIO signal to the controller device 302 on the SDIO signal line 316.

An SS signal is transmitted to the first peripheral device 306, the second peripheral device 308, the third peripheral device 310, and the fourth peripheral device 312 on an SS signal line 318. Each of the first peripheral device 306, the second peripheral device 308, and the third peripheral device 310 is operable pass the SS signal to the next peripheral device. In certain embodiments, the fourth peripheral device 312 is not operable to pass the SS signal to the controller device. For example, the fourth peripheral device 312 can float the SS signal.

All of the peripheral devices 306, 308, 310, 312 in the chain of peripheral devices 304 are linked in a daisy chain in that the first peripheral device 306, the second peripheral device 308, the third peripheral device 310, and the fourth peripheral device 312 are operably connected in a sequence or a ring. As will be described in more detail later, a single SS signal can be used to select one or more of the first peripheral device 306, the second peripheral device 308, the third peripheral device 310, and the fourth peripheral device 312. Additionally, a delay is matched between the SCLK signal and the SDIO signal, and between the SCLK signal and the SS signal.

Figure 4:
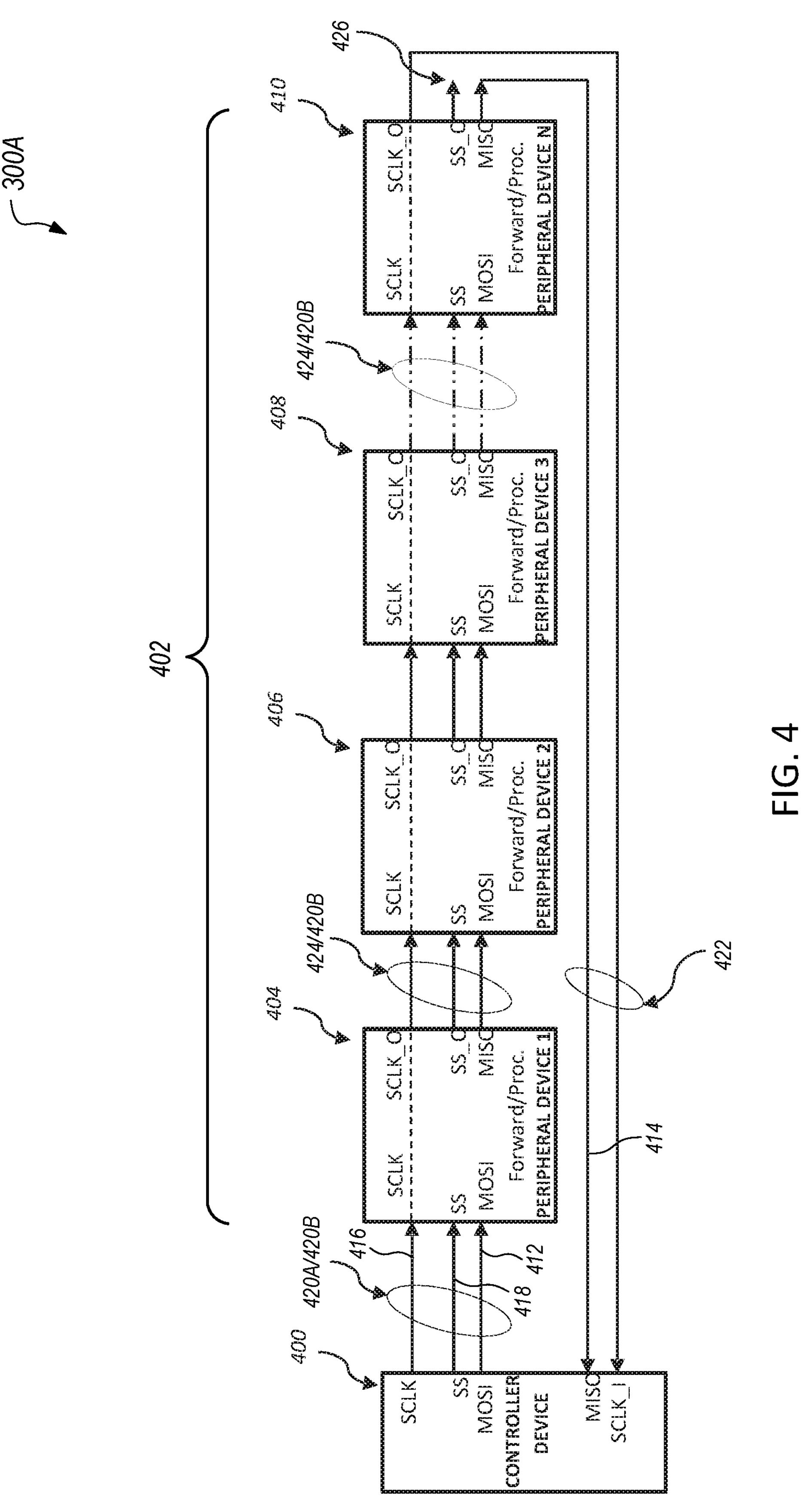
FIG. 4 illustrates one example implementation of the SPI system shown in FIG. 3 according to embodiments of the disclosure.

FIG. 4 illustrates one example implementation of the SPI system 300 shown in FIG. 3 according to embodiments of the disclosure. The example SPI system 300A includes a controller device 400 operably connected to a chain of peripheral devices 402. The chain of peripheral devices 402 includes N peripheral devices, where N is equal to or greater than two. In the illustrated embodiment, the chain of peripheral devices 402 includes a first peripheral device 404, a second peripheral device 406, a third peripheral device 408, and an Nth peripheral device 410 operably connected in series. As described earlier, all of the peripheral devices 404, 406, 408, 410 in the chain of peripheral devices 402 are linked in a daisy chain in that the first peripheral device 404, the second peripheral device 406, the third peripheral device 408, and the Nth peripheral device 410 are operably connected in a sequence or a ring. The chain of peripheral devices 402 is referred to herein as a daisy chain 402.

In the example embodiment, the SPI system 300A includes a MOSI signal line 412 and a MISO signal line 414 instead of an SDIO signal line (e.g., SDIO signal line 316 in FIG. 3). The controller device 400 transmits data to one or more of the first peripheral device 404, the second peripheral device 406, the third peripheral device 408, and/or the Nth peripheral device 410 ("targeted peripheral device") on the MOSI signal line 412. The controller device 400 receives data from the targeted peripheral device on the MISO signal line 414. In other embodiments, the MOSI signal line 412 and the MISO signal line 414 are combined into a bidirectional SDIO signal line (e.g., SDIO signal line 316 in FIG. 3). The use of the SDIO signal line reduces the four-wire SPI interface in FIG. 4 to a three-wire interface (e.g., the three-wire interface shown in FIG. 3). In FIG. 4, the four-wire SPI interface includes the MOSI signal line 412, the MISO signal line 414, the SCLK signal line 416, and the SS signal line 418, while the three-wire SPI interface shown in FIG. 3 includes the SCLK signal line 314, the SDIO signal line 316, and the SS signal line 318.

The controller device 400 is comprised of two sets of controller ports. A controller output set 420A comprises a controller SCLK pin (SCLK), a controller SS pin (SS), and a controller MOSI pin (MOSI) for providing the respective signals to the first peripheral device 404 in the daisy chain 402. The controller input set 422 include a controller internal clock pin (SCLK_I) and a controller MISO pin (MISO) for receiving the data from the Nth peripheral device 410 in the daisy chain 402.

Like the controller device 400, each peripheral device 404, 406, 408, 410 in the daisy chain 402 includes two sets of peripheral ports. For instance, the set of peripheral input ports 420B of the first peripheral device 404 is the same as the set of controller output ports 420A. The set of peripheral input ports 420B includes a peripheral input SCLK pin (SCLK), a peripheral input SS pin (SS), and a peripheral input MOSI pin (MOSI), which are operably connected to corresponding pins in the controller device 400 for receiving the respective SCLK signal, SS signal, and MOSI signal. The first peripheral device 404 also has a set of peripheral output ports 424, which includes a peripheral output clock signal pin (SCLK_O), a peripheral output select signal pin (SS_O), and a peripheral output MOSI pin (MOSI). The set of peripheral output ports 424 of the first peripheral device 404 are operably connected to corresponding pins in the set of peripheral input ports 420B in the second peripheral device 408. Similarly, the SCLK_O pin, the SS_O pin, and the MOSI pin of the set of peripheral output ports 424 of the second peripheral device 406 are operably connected to corresponding pins in the set of peripheral input ports 420B in the third peripheral device 408, and the SCLK_O pin, the SS_O pin, and the MOSI pin of the set of peripheral output ports 424 of the third peripheral device 410 are operably connected to corresponding pins in the set of peripheral input ports 420B in the Nth peripheral device 410. Accordingly, the SCLK signal, the SS signal, and the MOSI signal that are received by each of the second peripheral device 406, the third peripheral device 408, and the Nth peripheral device 410 are provided as though the SCLK signal, the SS signal, and the MOSI signal are provided by the controller device 400.

As shown in FIG. 4, there is no global signal from the controller device 400 that is shared among the first peripheral device 404, the second peripheral device 406, the third peripheral device 408, and the Nth peripheral device 410. Instead, all of the SPI signals (e.g., the SCLK signal, the SS signal, and the MOSI signal) output by the controller device 400 are point-to-point, forwarded from one peripheral device to the next peripheral device in the daisy chain 402, until the entire set of SPI signals reach the last peripheral device in the daisy chain 402 (e.g., the Nth peripheral device 410). In certain embodiments, the final peripheral device floats the SS_O signal because there is no subsequent peripheral device to select, as represented by the arrow 426. The SCLK_O signal is transmitted back to the controller internal SCLK_I pin of the controller device 400, and the MISO signal is transmitted back to the controller MISO pin of the controller device 400.

One advantage to the embodiment shown in FIG. 4 is that the SPI system 300A is operable to operate without a global signal that transmittable to all of the peripheral devices. The SPI system 300A eliminates the SS pin requirement on the controller device 400 (e.g., SS pins 116, 118 in FIG. 1), as well as the clock over/under-run problem caused by connecting multiple peripheral devices to a single clock signal line provided from the controller device 400.

Figure 5:
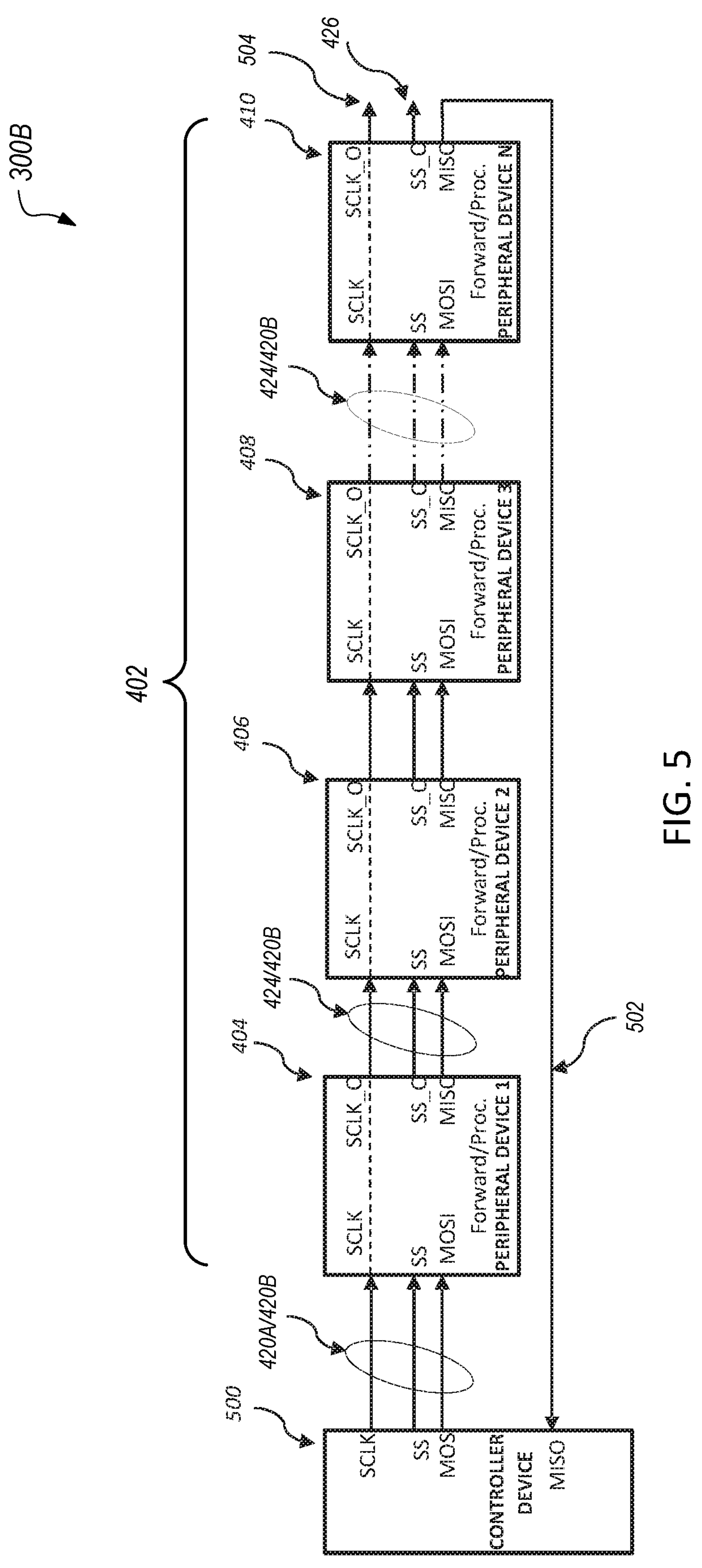
FIG. 5 illustrates another example implementation of the SPI system shown in FIG. 3 according to embodiments of the disclosure.

FIG. 5 illustrates another example implementation of the second SPI system 300 shown in FIG. 3 according to embodiments of the disclosure. The example SPI system 300B is similar to the SPI system 300A shown in FIG. 4 except for the omission of the controller internal SCLK_I pin in the controller device 500. The SPI system 300B includes the controller device 500 operably connected to the daisy chain 402. The daisy chain 402 includes the first peripheral device 404, the second peripheral device 406, the third peripheral device 408, and the Nth peripheral device 410. The set of controller output ports 420A includes the SCLK pin, the SS pin, and the MOSI pin. The set of peripheral input ports 420B includes the SCLK pin, the SS pin, and the MOSI pin. The set of peripheral output ports 424 includes the SCLK_O pin, the SS_O pin, and the MISO pin. Unlike the SPI system 300A in FIG. 4, the set of controller input ports 502 includes only the controller MISO pin.

Similar to FIG. 4, all of the SPI signals (e.g., the SCLK signal, the SS signal, and the MOSI signal) output by the controller device 500 are point-to-point, forwarded from one peripheral device to the next peripheral device in the daisy chain 402, until the entire set of SPI signals reach the last peripheral device in the daisy chain 402 (e.g., the Nth peripheral device 410). In certain embodiments, the final peripheral device floats both the SCLK_O signal (represented by arrow 504) and the SS_O signal (represented by arrow 426) because there is no subsequent peripheral device to select, while the MISO signal is transmitted back to the controller MISO pin of the controller device 500.

In some instances, the embodiment in FIG. 4 is suitable for SPI systems that include a higher number of peripheral devices operably connected in the daisy chain 402 (e.g., the number of peripheral devices is greater than four (4)). The embodiment of FIG. 5 can be suitable for SPI systems that have a fewer number of peripheral devices in the daisy chain 402 (e.g., the number of peripheral devices is less than four (4)). Additionally or alternatively, one or more factors can be considered when determining a number of peripheral devices to include in a daisy chain. For example, the accumulated delay on the clock signal through all of the peripheral devices in a chain may be a factor.

Figure 6:
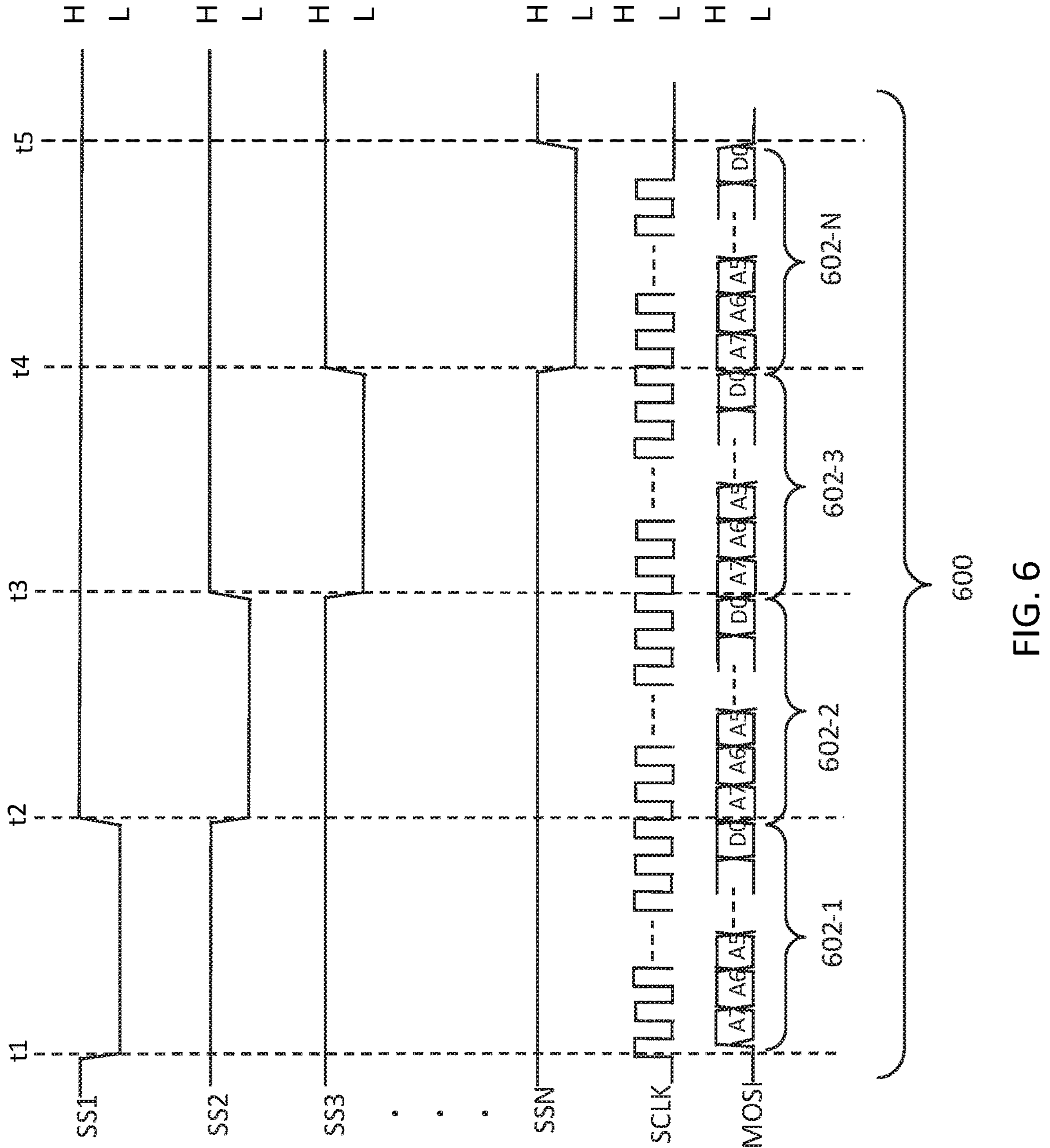
FIG. 6 illustrates an example timing diagram for a single transaction in the SPI system shown in FIG. 4 and FIG. 5 according to embodiments of the disclosure.

FIG. 6 illustrates an example timing diagram for a single transaction in the SPI system 300A shown in FIG. 4 according to embodiments of the disclosure. The example timing diagram depicts a single transmission 600 that includes N transactions (e.g., one transaction for each peripheral device in the daisy chain). For example, the transaction 602-1 is for the first peripheral device 404, the transaction 602-2 is for the second peripheral device 406, the transaction 602-3 is for the third peripheral device 408, and the transaction 602-N is for the Nth peripheral device 410.

The controller device 400 outputs an SS signal that is operable to select the first peripheral device 404, the second peripheral device 406, the third peripheral device 408, and the Nth peripheral device 410 in the daisy chain 402. In certain embodiments, the SS signal includes an SS1 signal for the first peripheral device 404, an SS2 signal for the second peripheral device 406, an SS3 signal for the third peripheral device 408, and an SS4 signal for the Nth peripheral device 410. In other embodiments, and as described later, only one SS signal with one select transition (e.g., transition from high to low and then back to high) is transmitted by the controller device 400. Each peripheral device is operably to delay the SS signal for a given time period before the peripheral device passes the SS signal to the next peripheral device in the serial daisy chain.

Each peripheral device performs an action (e.g., a read transaction or a write transaction) that is identified in data that is received from the controller device 400 in the MOSI signal. In certain embodiments, the data in the MOSI signal includes an address field, a command field (e.g., a read bit or a write bit), and a data field. One non-limiting nonexclusive example format of the address field, the command field, and the data field in the MOSI signal is shown in FIG. 2.

The first peripheral device 404 forwards the SCLK signal from the input of the first peripheral device 404 to the output of the first peripheral device 404. The SCLK signal is the synchronization clock signal for the subsequent peripheral devices in the daisy chain 402. The first peripheral device 404 also forwards the MOSI signal for the entire transaction when the first peripheral device 404 is executing a write transaction or when the first peripheral device is not selected. When the transaction is a read transaction, the first peripheral device 404 replaces the data field in the MOSI signal with the data read out and then forwards the MOSI signal to the next peripheral device 406. As will be discussed in more detail in conjunction with FIG. 9, each peripheral device in the daisy chain 402 is operable to delay the SS signal for the entire transaction that is performed by that peripheral device. The peripheral device then transmits the SS signal to the next peripheral device in the daisy chain (as the SS signal for the next peripheral device).

For example, in FIG. 4, the first peripheral device 404 is operable to delay the SS signal for an entire transaction that is performed by the first peripheral device 404 (e.g., delay the SS signal for a total number of SCLK clock pulses during the entire read or write action performed by the first peripheral device 404). The first peripheral device 404 then transmits the SS signal to the second peripheral device 406. The second peripheral device 406 is operable to delay the SS signal for the entire transaction that is performed by the second peripheral device 406 (e.g., delay the SS signal for a total number of SCLK clock pulses during the entire read or write action performed by the second peripheral device 406). The second peripheral device 406 then transmits the SS signal to the third peripheral device 408. The third peripheral device 408 is operable to delay the SS signal for the entire transaction that is performed by the third peripheral device 408 (e.g., delay the SS signal for a total number of SCLK clock pulses during the entire read or write action performed by the third peripheral device 408). The third peripheral device 408 then transmits the SS signal to the next peripheral device in the daisy chain. When N is four (4), the third peripheral device 408 transmits the SS signal to the fourth peripheral device 410. The fourth peripheral device 410 is operable to delay the SS signal for the entire transaction that is performed by the fourth peripheral device 410 (e.g., delay the SS signal for a total number of SCLK clock pulses during the entire read or write action performed by the fourth peripheral device 410). The fourth peripheral device 410 then floats the SS signal because the fourth peripheral device 410 is the last peripheral device in the daisy chain 402.

Continuing with the example of FIG. 4, the first peripheral device passes the SCLK signal from an input of the first peripheral device 404 to an output of the first peripheral device 404. One or more of the peripheral devices are operable to delay the SS signal for a total number SCLK clock pulses in one transaction (e.g., a read transaction or a write transaction). The SS signal in the daisy-chained SPI system retains the function of selecting a respective peripheral device targeted for a transaction. In some instances, the SS signal output from one peripheral device selects the next peripheral device in the daisy chain. In certain embodiments, one or more peripheral devices in the daisy chain are operable to pass the MOSI signal through the peripheral device when the peripheral device is not the target peripheral device (e.g., not the peripheral device to execute a transaction). When a transaction is a write transaction, a targeted peripheral device is operable to pass the MOSI signal through the peripheral device. For a read transaction, a targeted peripheral device is operable to output data from the peripheral device.

In FIG. 6, the SS signal (shown as SS1 signal) transitions from a high signal level to a low signal level at time t1 to select the first peripheral device 404 in the daisy chain 402. The SS1 signal remains at the low signal level during the entire time the first peripheral device 404 is performing the transaction 602-1. The first peripheral device 404 executes the command identified by the read/write bit in the command field in the data associated with the transaction 602-1. The data in the MISO signal can have a format that is similar to the data format shown in FIG. 2. The SS1 signal transitions back to a high signal level at time t2 (e.g., at the end of the transaction 602-1). The first peripheral device 404 then passes the SS signal to the second peripheral device 406 in the daisy chain 402.

The SS signal (shown as SS2 signal) transitions from a high signal level to a low signal level at time t2 to select the second peripheral device 406 in the daisy chain 402. The SS2 signal remains at the low signal level during the entire time the second peripheral device 406 is performing the transaction 602-2. The second peripheral device 406 executes the command identified by the read/write bit in the command field in the data associated with the transaction 602-2. The SS2 signal transitions back to a high signal level at time t3 (e.g., at the end of the transaction 602-2). The second peripheral device 406 then passes the SS signal to the third peripheral device 408 in the daisy chain 402.

The SS signal (shown as SS3 signal) transitions from a high signal level to a low signal level at time t3 to select the third peripheral device 408 in the daisy chain 402. The SS3 signal remains at the low signal level during the entire time the third peripheral device 408 is performing the transaction 602-3. The third peripheral device 408 executes the command identified by the read/write bit in the command field in the data associated with the transaction 602-3. The SS3 signal transitions back to a high signal level at time t4 (e.g., at the end of the transaction 602-3). When N+4, the third peripheral device 408 then passes the SS signal to the Nth peripheral device 410 in the daisy chain 402.

The SS signal (shown as SS4 signal) transitions from a high signal level to a low signal level at time t4 to select the Nth peripheral device 410 in the daisy chain 402. The SS4 signal remains at the low signal level during the entire time the Nth peripheral device 410 is performing the transaction 602-N. The Nth peripheral device 410 executes the command identified by the read/write bit in the command field in the data associated with the transaction 602-N. The SS4 signal transitions back to a high signal level at time t5 (e.g., at the end of the transaction 602-N). The Nth peripheral device 410 then then passes the SS signal to the controller device 400.

In other embodiments, when N is greater than four, the SSN signal selects the Nth peripheral device 410 sometime after the selection of the third peripheral device 408. Additionally, as described earlier, an SPI system can include two or more peripheral devices. Those skilled in the art will recognize the timing diagram shown in FIG. 6 can be modified for the number of peripheral devices in a daisy chain.

In some embodiments, each peripheral device is not a targeted peripheral device in that one or more of the peripheral devices in the chain of peripheral devices may not perform an action during a transmission. The respective SS signal for a peripheral device that will not perform an action (a "no-action peripheral device") may still transition to select the no-action peripheral device, and the no-action peripheral device can receive the SCLK signal and the MOSI signal. However, in such embodiments, the controller device is operable to include a "no op" command (e.g., a random command) for the no-action peripheral device in the transmission (e.g., in the MOSI signal). The controller is also operable to ignore the data that is returned from the no-action peripheral device.

Figure 7:
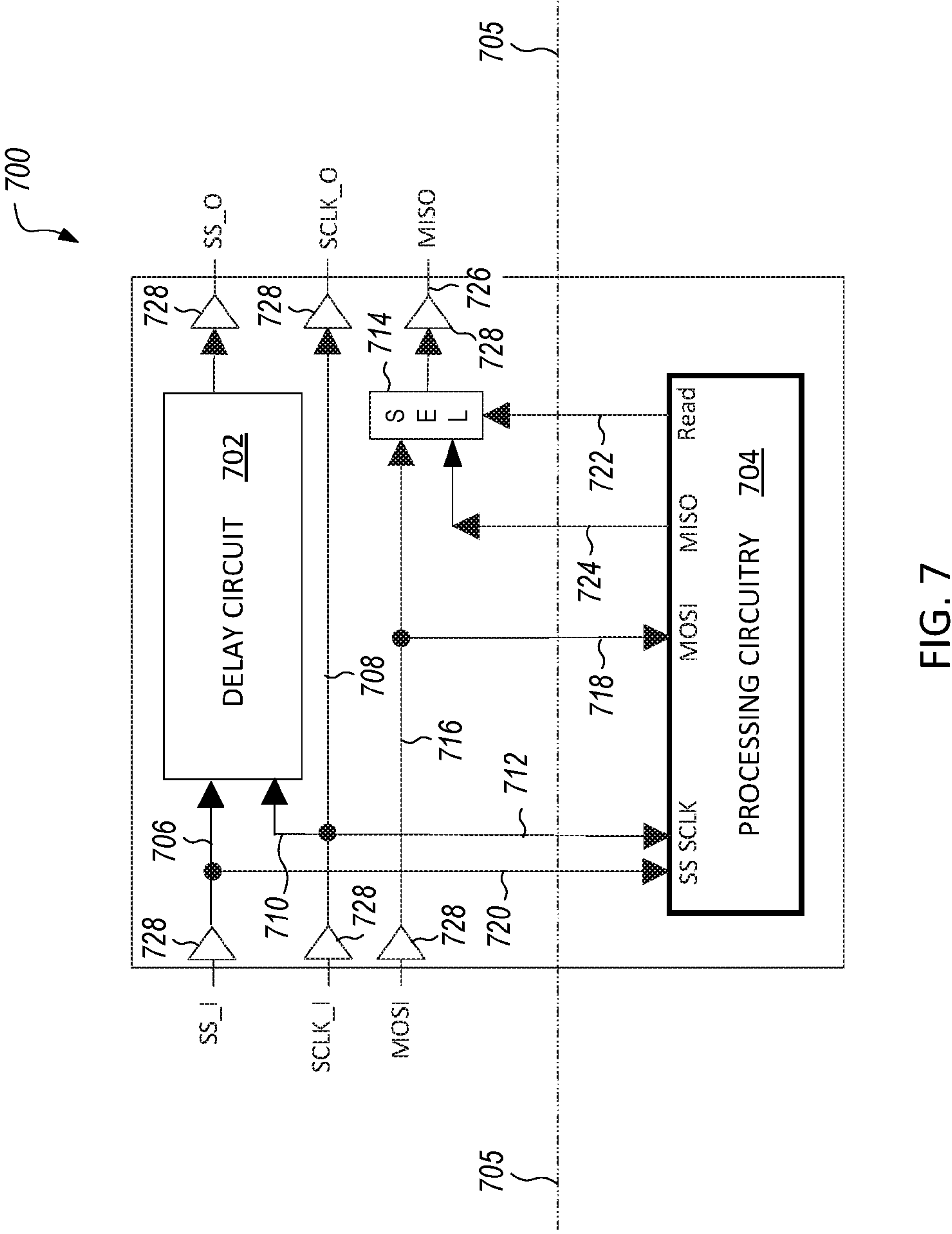
FIG. 7 illustrates an example block diagram of a peripheral device according to embodiments of the disclosure.

FIG. 7 illustrates an example block diagram of a peripheral device 700 according to embodiments of the disclosure. The arrows indicate the flow of the signals within the peripheral device 700. In some embodiments, the peripheral devices 306, 308, 310, 312 in FIG. 3, the peripheral devices 404, 406, 408, 410 in FIG. 4 and FIG. 5, the peripheral device 1004 in FIG. 10, and/or the peripheral devices 1106 in FIG. 11 can be implemented as the peripheral device 700.

The peripheral device 700 includes a delay circuit 702 and processing circuitry 704. The dashed line 705 is used to indicate the circuitry below the dashed line 705 (e.g., the processing circuitry 704) may be implemented as conventional circuitry in a peripheral device. The processing circuitry 704 can include circuits such as a processing device and a memory operably connected to the processing device. In a non-limiting nonexclusive example, the processing device can be any suitable processing device, such as a microprocessor, a field-programmable gate array, an application-specific integrated circuit, a central processing unit, or combinations thereof. The memory may be a volatile memory (e.g., random access memory), a non-volatile memory (e.g., read-only memory), or combinations thereof.

The peripheral device 700 receives the SS signal, the SCLK signal, and the MOSI signal (or an SDIO signal in other embodiments) as inputs. The peripheral device 700 receives the SS signal at an input pin (SS_I) and transmits the SS signal to the delay circuit 702 on signal line 706. The delay circuit 702 is operable to delay the SS signal delay by a whole number of clock cycles of a transaction. For example, in an SPI system that includes an SDIO signal with the data shown in FIG. 2, or a MOSI signal with the data shown in FIG. 2, the delay signal is operable to delay the SS signal for seventeen (17) SCLK clock pulses (one clock pulse for each bit in the SDIO signal or in the MISO signal). In a non-limiting non-exclusive example, the delay circuit 702 includes a number of delay (D) flip-flops operably connected in series. The number of D flip-flops in the series is based on the amount of time associated with the execution of a transaction (e.g., the whole number of clock cycles of the transaction). The delay circuit 702 outputs a delayed SS signal and the peripheral device outputs the delayed SS signal at an output pin (SS_O).

The peripheral device 700 receives the SCLK signal at an input pin (SCLK_I) and passes the SCLK signal to an output pin (SCLK_O) on signal line 708. The SCLK signal is also received by the delay circuit 702 on signal line 710 and by the processing circuitry 704 on signal line 712.

The peripheral device 700 receives the MOSI signal at an input pin (MOSI) and transmits the MOSI signal to a select circuit (SEL) 714 on signal line 716. The MOSI signal is also received by the processing circuitry 704 on signal line 718. In a non-limiting nonexclusive example, the select circuit 714 is a multiplexer.

The peripheral device 700 also transmits the SS signal to the processing circuitry 704 on signal line 720. The processing circuitry 704 is operable to determine whether the peripheral device is a selected or targeted peripheral device based on a state or signal level of the SS_I signal. When the peripheral device is targeted to perform a read transaction, the processing circuitry 704 is operable to read the data from the memory and output the data (a "read transaction signal") on signal line 722. When the peripheral device is targeted to perform a write transaction, the processing circuitry 704 is operable to receive the data (a "write transaction signal") to be stored on signal line 718 and write the data to the memory.

The select circuit 714 is operable to receive the MOSI signal on signal line 716, a data select signal on signal line 722, and a MISO signal that includes the data read out on signal line 724. The data select signal on the signal line 722 operates as a select signal that is used by the select circuit 714 to select either the signal line 716 to output the MOSI signal or to select signal line 724 to output the MOSI signal with the readout data from the read operation. In certain embodiments, for a read transaction, the processing circuitry 704 replaces the data field in the MOSI signal with the data read out.

The select circuit 714 transmits an output signal on signal line 726. The output signal is output from the peripheral device 700 as a MISO signal at a MISO output pin. Buffer circuits 728 are operable to buffer respective input signals (SS, SLCK, MOSI) and respective output signals (SS, SCLK, MISO).

The example peripheral device 700 may be used in the example first SPI system shown in FIG. 1. Thus, the peripheral device 700 provides flexibility in that the peripheral device 700 may be used in more than one implementation of an SPI system (e.g., in the first SPI system shown in FIG. 1 and in the SPI systems shown in FIGS. 3-5, 8, and 9).

Figure 8:
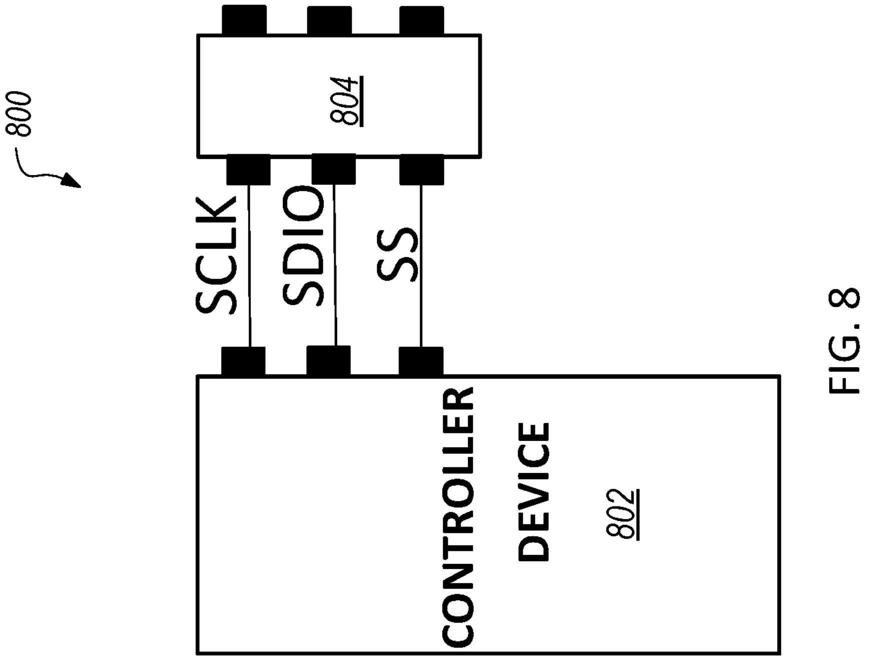
FIG. 8 illustrates a block diagram of an example third SPI system that includes a controller device and a single chain of one peripheral device according to embodiments of the disclosure.

FIG. 8 illustrates a block diagram of an example third SPI system 800 that includes a controller device 802 and a single chain of one peripheral device 804 according to the embodiments of the disclosure. The controller device 802 is operable to output the SS signal for only one transaction in a transmission. The SS signal is operable to only select the peripheral device 804. The data in the MOSI signal is associated with only one transaction that is to be performed by the peripheral device 804. In some embodiments, the SDIO signal is not passed back to the controller device because the number of peripheral devices is small.

Figure 9:
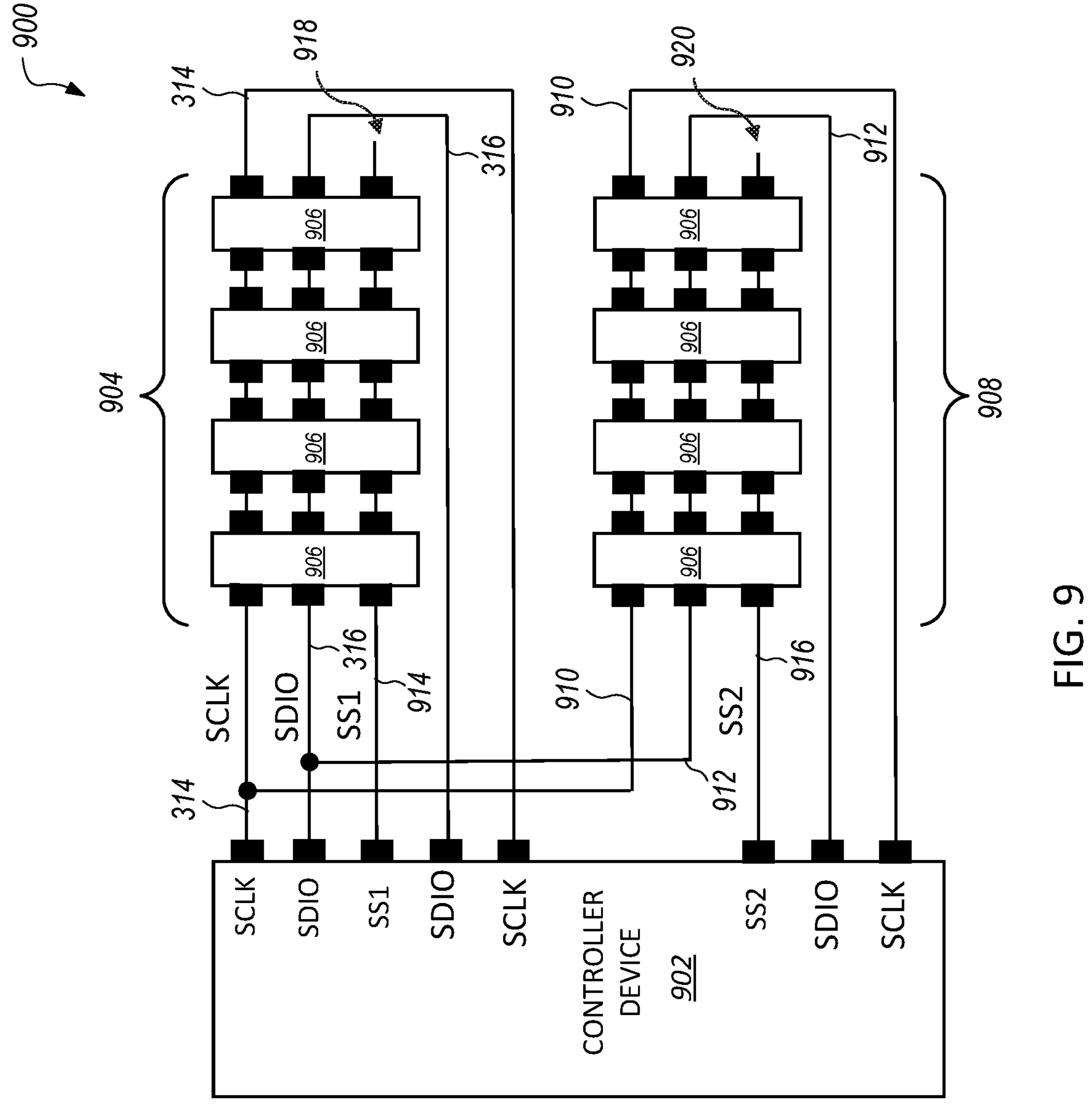
FIG. 9 illustrates a block diagram of an example fourth SPI system that includes multiple chains of peripheral devices according to embodiments of the disclosure.

FIG. 9 illustrates a block diagram of an example fourth SPI system 900 that includes multiple chains of peripheral devices according to embodiments of the disclosure. In the example fourth SPI system 900, a controller device 902 is operably connected to a first daisy chain 904 and to a second daisy chain 908. Other embodiments can include a different number of daisy chains.

The first daisy chain 904 includes N peripheral devices 906 operably connected in series, and the second daisy chain 908 includes M peripheral devices 906 operably connected in series. The variables N and M can each be equal to or greater than two. In certain embodiments, N=M. In other embodiments, N differs from M (e.g., N<M or N>M). Typically, the controller device 902 has setup information to enable the controller device 902 to know the total number of clock signals to send for the SS1 signal on the signal line 914 and the SS2 signal on the signal line 916. In certain embodiments, the SS1 signal and the SS2 signal are used to select either the first daisy chain 904 or the second daisy chain 908. The selected daisy chain 904, 908 receives the SCLK signal and the SDIO signal. The unselected daisy chain 904, 908 ignores both the SDIO signal and the clock signal.

The controller device 902 is operable to transmit an SCLK signal to the first daisy chain 904 on SCLK signal line 314 and to the second daisy chain 908 on signal line 910. The controller device 902 is also operable to transmit an SDIO signal to the first daisy chain 904 on SDIO signal line 316 and to the second daisy chain 908 on signal line 912. In other embodiments, the fourth SPI system 900 includes MOSI signal lines and MISO signal lines instead of the SDIO signal lines 316, 912.

The controller device 902 is operable to transmit a first select signal SS1 to the first daisy chain 904 on signal line 914, and to transmit a separate second select signal SS2 to the second daisy chain 908 on signal line 916.

In certain embodiments, the last peripheral device 906 in the first daisy chain 904 passes the SCLK signal to the controller device 902 on the SCLK signal line 314. The last peripheral device 906 in the first daisy chain 904 passes the SDIO signal to the controller device 902 on the SDIO signal line 316. The last peripheral device 906 in the first daisy chain 904 floats the SS1 signal, as shown by arrow 918.

In some embodiments, the last peripheral device 906 in the second daisy chain 908 passes the SCLK signal to the controller device 902 on signal line 910. The last peripheral device 906 in the second daisy chain 908 passes the SDIO signal to the controller device 902 on signal line 912. The last peripheral device 906 in the second daisy chain 908 floats the SS2 signal, as shown by arrow 920.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A serial peripheral interface (SPI) system, comprising:

a controller device;

a daisy chain of three or more peripheral devices operably connected to the controller device, wherein the three or more peripheral devices in the daisy chain are operably connected in series;

a serial data input-output signal (SDIO) signal line connected in series between each of the three or more peripheral devices in the daisy chain, wherein the controller device is operable to transmit a single data signal to the daisy chain along the SDIO signal line, the data signal including at least one transaction for any number of the three or more peripheral devices in the daisy chain of three or more peripheral devices and wherein the data signal with the transaction is passed between the three or more peripheral devices along the SDIO signal line from a beginning peripheral device of the three or more peripheral devices in the daisy chain to an end peripheral device of the three or more peripheral devices in the daisy chain; and a peripheral select (PS) signal line connected in series between the each of the three or more peripheral devices in the daisy chain, wherein the controller device is operable to transmit a single select signal along the PS signal line, and wherein the single select signal is operable to select the any number of the peripheral devices in the daisy chain of the three or more peripheral devices.

2. The SPI system of claim 1, wherein:

the daisy chain is a first daisy chain; and the SPI system further comprises a second daisy chain of two or more peripheral devices operably connected to the controller device, wherein the two or more peripheral devices in the second daisy chain are operably connected in series.

3. The SPI system of claim 1, wherein the controller device is operable to transmit a single clock signal to the daisy chain of the three or more peripheral devices.

4. The SPI system of claim 1, wherein the data signal is a bidirectional serial input-output signal.

5. The SPI system of claim 1, wherein the data signal comprises a controller-output-peripheral-input signal and a controller-input-peripheral-output signal.

6. A peripheral device for use in a serial peripheral interface (SPI) system, the peripheral device comprising:

a delay circuit operable to receive a select signal and a clock signal and delay the select signal for a total number of clock pulses in a transaction to be performed by the peripheral device;

processing circuitry operable to receive the select signal, the clock signal, and a data signal;

a select circuit operable to receive the data signal and a read transaction signal and to select one of the data signal or the read transaction signal as an output signal;

wherein the peripheral device is operable to be connected in a daisy chain of three or more peripheral devices such that the peripheral device is configured to operate along a serial data input-output signal (SDIO) signal line that is configured to be connected in series between a beginning peripheral device of the three or more peripheral devices in the daisy chain to an end peripheral device of the three or more peripheral devices in the daisy chain, wherein the peripheral device is configured to operate as an intermediary peripheral device connected in the daisy chain between the beginning peripheral device and the end peripheral device;

wherein the peripheral device is configured to receive a single data signal along the SDIO signal line in the daisy chain from the beginning peripheral device and transmit the single data signal along the SDIO signal line toward the end peripheral device so that the data signal with the transaction is passed between the three or more peripheral devices along the SDIO signal line from the beginning peripheral device of the three or more peripheral devices in the daisy chain to the end peripheral device of the three or more peripheral devices in the daisy chain through the peripheral device, the data signal including at least one transaction for any number of the three or more peripheral devices in the daisy chain; and wherein the peripheral device is configured to be connected along a peripheral select (PS) signal line that is configured to be connected in series between each of the three or more peripheral devices in the daisy chain, wherein the peripheral device is configured to receive a single select signal along the PS signal line from the beginning peripheral device and to transmit the single select signal along the PS line toward the end peripheral device along the daisy chain, the select signal being operable to select the any number of the peripheral devices in the daisy chain of the three or more peripheral devices.

7. A serial peripheral interface (SPI) system, comprising:

a controller device;

one or more daisy chains of two or more peripheral devices operably connected to the controller device, wherein the two or more peripheral devices in each of the one or more daisy chains are operably connected in series, wherein the one or more daisy chains comprise a first daisy chain of three or more peripheral devices, the first daisy chain further comprising:

a serial data input-output signal (SDIO) signal line connected in series between each of the three or more peripheral devices in the daisy chain, wherein the controller device is operable to transmit a single data signal to the daisy chain along the SDIO signal line, the data signal including at least one transaction for any number of the three or more peripheral devices in the daisy chain of three or more peripheral devices and wherein the data signal with the transaction is passed between the three or more peripheral devices along the SDIO signal line from a beginning peripheral device of the three or more peripheral devices in the daisy chain to an end peripheral device of the three or more peripheral devices in the daisy chain; and a peripheral select PS signal line connected in series between the each of the three or more peripheral devices in the daisy chain, wherein the controller device is operable to transmit a single select signal along the PS signal line, and wherein the single select signal is operable to select the any number of the peripheral devices in the daisy chain of the three or more peripheral devices.

8. The SPI system of claim 7, wherein:

the one or more daisy chains further comprise a second daisy chain of two or more peripheral devices operably connected to the controller device, wherein the two or more peripheral devices in the second daisy chain are operably connected in series.

9. The SPI system of claim 8, wherein the single select signal is a first select signal and wherein the controller device is further operable to:

transmit a second select signal that is operable to select one or more of the peripheral devices in the second daisy chain.

10. The SPI system of claim 8, wherein the controller device is operable to transmit a single clock signal to the first daisy chain and the second daisy chain.

11. The SPI system of claim 8, wherein the controller device is operable to:

transmit the data signal to the first daisy chain, the data signal including at least one transaction for a respective peripheral device in the first daisy chain; and transmit the data signal to the second daisy chain.

12. The SPI system of claim 11, wherein the data signal is a bidirectional serial input-output signal.

13. The SPI system of claim 8, wherein the controller device is operable to:

transmit a single clock signal to the first daisy chain; and transmit the single clock signal to the second daisy chain.

* * * * *